(12) United States Patent
Paul

(10) Patent No.: US 9,920,787 B2
(45) Date of Patent: Mar. 20, 2018

(54) CONNECTING ROD AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/056,274

(22) Filed: Feb. 29, 2016

(65) Prior Publication Data

US 2016/0258478 A1    Sep. 8, 2016

(30) Foreign Application Priority Data

Mar. 5, 2015    (DE) .................. 10 2015 103 206

(51) Int. Cl.
*F02B 75/32*    (2006.01)
*F16C 7/06*    (2006.01)
(Continued)

(52) U.S. Cl.
CPC .............. *F16C 7/06* (2013.01); *F02B 75/045* (2013.01); *F16C 23/10* (2013.01);
(Continued)

(58) Field of Classification Search
CPC .. F02B 75/044; F02B 75/045; F04B 39/0292; F16C 7/06; F02D 15/02
See application file for complete search history.

(56) References Cited

U.S. PATENT DOCUMENTS 2,232,170 A * 2/1941 Eynon .................. F16C 9/04
                                                123/196 R
2,239,834 A    4/1941 Williams
(Continued)

FOREIGN PATENT DOCUMENTS

DE    1780437 U    12/1958
DE    19647735 C1    2/1998
(Continued)

OTHER PUBLICATIONS

German Search Report dated Oct. 6, 2015.
German Search Report dated Jan. 4, 2017.

*Primary Examiner* — Marguerite McMahon
*Assistant Examiner* — Tea Holbrook
(74) *Attorney, Agent, or Firm* — Gerald E. Hespos; Michael J. Porco; Matthew T. Hespos

(57) ABSTRACT

A connecting rod (10) has a big end bearing eye (11) for attachment to a crankshaft, a small end bearing eye (12) for attachment to a piston, and an eccentric adjusting device (13) for adjusting an effective connecting rod length. The eccentric adjusting device (13) has eccentric rods (15, 16) that engage on an eccentric lever (14), an eccentric (36) that is guided in an aperture in the eccentric lever (14) and in the small end bearing eye (12) and an aperture for accommodating a piston pin (37). Lubricating oil bores (38, 39) are introduced into the small end bearing eye (12) via which a lubricating oil film can be built up between the small end bearing eye (12) and the eccentric (36). The small end bearing eye (12) has a larger radial wall thickness in those regions in which the lubricating oil bores (38, 39).

11 Claims, 2 Drawing Sheets

(51) Int. Cl.
*F02B 75/04* (2006.01)
*F16H 57/04* (2010.01)
*F16C 23/10* (2006.01)
*F16C 33/10* (2006.01)
*F16C 9/04* (2006.01)

(52) U.S. Cl.
CPC ..... *F16C 33/1045* (2013.01); *F16H 57/0471* (2013.01); *F16C 9/04* (2013.01); *F16C 2360/22* (2013.01)

(56) References Cited

U.S. PATENT DOCUMENTS

| | | | | |
|---|---|---|---|---|
| 2,741,519 | A * | 4/1956 | Meurer | F01M 1/06 |
| | | | | 123/263 |
| 3,056,638 | A * | 10/1962 | Hovde | F16J 1/14 |
| | | | | 123/193.6 |
| 3,482,467 | A * | 12/1969 | Volkel | F16C 7/023 |
| | | | | 74/579 R |
| 4,142,484 | A * | 3/1979 | Buhl | F01M 1/06 |
| | | | | 123/193.6 |
| 6,250,275 | B1 * | 6/2001 | Bock | F01M 1/08 |
| | | | | 123/196 R |
| 6,907,848 | B2 * | 6/2005 | Beardmore | F01M 1/06 |
| | | | | 123/41.35 |
| 9,322,331 | B2 | 4/2016 | Hutzelmann et al. | |
| 2003/0075125 | A1 * | 4/2003 | Kreuter | F02B 75/048 |
| | | | | 123/78 BA |
| 2004/0065292 | A1 | 4/2004 | Meyer | |
| 2010/0055490 | A1 * | 3/2010 | Sugihashi | C21D 7/00 |
| | | | | 428/596 |
| 2011/0005493 | A1 * | 1/2011 | Hirano | B23K 20/227 |
| | | | | 123/456 |
| 2015/0075497 | A1 | 3/2015 | Hutzelmann et al. | |
| 2015/0260094 | A1 | 9/2015 | Wittek | |

FOREIGN PATENT DOCUMENTS

| | | | | |
|---|---|---|---|---|
| DE | 10 2005 055 199 | | 5/2007 | |
| DE | 10 2010 016 037 | | 9/2011 | |
| DE | 102011002138 A1 * | 10/2012 | ........... F02B 75/045 |
| FR | 2897125 | | 8/2007 | |
| GB | 1512191 | | 5/1978 | |
| GB | 2319582 A | | 5/1998 | |
| JP | S5893906 A | | 6/1983 | |
| JP | 1303310 | | 12/1989 | |
| JP | 2015014286 A | | 1/2015 | |
| WO | 2014019683 A1 | | 2/2014 | |

* cited by examiner

CONNECTING ROD AND INTERNAL COMBUSTION ENGINE

CROSS REFERENCE TO RELATED APPLICATION

This application claims priority under 35 USC 119 to German Patent Appl. No. 10 2015 103 206.6 filed on Mar. 5, 2015, the entire disclosure of which is incorporated herein by reference.

BACKGROUND

1. Field of the Invention

The invention relates to a connecting rod for an internal combustion engine and to an internal combustion engine.

2. Description of the Related Art

DE 10 2010 016 037 A1 and FIG. 1 herein show a connecting rod of an internal combustion engine having an adjustable compression ratio. The connecting rod 10 has a big end bearing eye 11 and a small end bearing eye 12. The big end bearing eye 11 is used to attach the connecting rod 10 to a crankshaft (not shown in FIG. 1) and the small end bearing eye 12 is used to attach the connecting rod 10 to a cylinder piston (not shown in FIG. 1) of the internal combustion engine. The connecting rod 10 is assigned an eccentric adjusting device 13 that has an eccentric (not shown in FIG. 1), an eccentric lever 14 and eccentric rods 15, 16. The eccentric lever 14 has an aperture arranged eccentrically with respect to a center 17 of the small end bearing eye 12 and the aperture has a center 18. The aperture in the eccentric lever 14 accommodates the eccentric and an aperture in the eccentric accommodates a piston pin. The eccentric adjusting device 13 is used to adjust an effective connecting rod length $l_{\mathit{eff}}$, which refers to the distance of the center 18 of the aperture in the eccentric lever 14 from a center 19 of the big end bearing eye 11. The eccentric rods 15, 16 can be moved to turn the eccentric body 14 and hence to change the effective connecting rod length $l_{\mathit{eff}}$. Each eccentric rod 15, 16 is assigned a piston 20, 21 that is guided movably in a hydraulic chamber 22, 23. A hydraulic pressure prevails in the hydraulic chambers 22, 23 and acts on the pistons 20, 21 assigned to the eccentric rods 15, 16. The movement of the eccentric rods 15, 16 is possible or not possible, depending on the oil quantity in the hydraulic chambers.

The adjustment of the eccentric adjusting device 13 is initiated by inertia forces and load forces of the internal combustion engine that act on the eccentric adjusting device 13 during an operating cycle of the internal combustion engine. The directions of the forces acting on the eccentric adjusting device 13 change continuously during an operating cycle. The adjusting movement is assisted by the pistons 20, 21 acted upon by hydraulic oil. The pistons 20, 21 act on the eccentric rods 15, 16 and prevent return of the eccentric adjusting device 13 due to varying directions of action of the forces acting on the eccentric adjusting device 13. The eccentric rods 15, 16 that interact with the pistons 20, 21 are attached to the eccentric body 14 on both sides. The hydraulic chambers 22 and 23 in which the pistons 20, 21 are guided can be supplied with hydraulic oil from the big end bearing eye 11 via hydraulic oil lines 24 and 25. Check valves 26 and 27 prevent the hydraulic oil from flowing back out of the hydraulic chambers 23 and 24 into the hydraulic lines 24 and 25. A changeover valve 29 is accommodated in a bore 28 in the connecting rod 10. The switching position of the changeover valve 29 determines which of the hydraulic chambers 22 and 23 is filled with hydraulic oil and which is emptied, wherein the adjusting direction or turning direction of the eccentric adjusting device 13 depends thereon. In this case, the hydraulic chambers 22 and 23 are in contact via fluid lines 30 and 31, respectively, with the bore 28 that accommodates the changeover valve 29. An actuating means 32, a spring device 33 and a control piston 34 of the changeover valve 29 are shown schematically in FIG. 1. The operation of these components of the changeover valve 29 is known from DE 10 2010 016 037 A1.

As explained above, the hydraulic oil that acts on the pistons 20, 21 is fed to the hydraulic chambers 22, 23 via hydraulic lines 24 and 25, starting from the big end bearing eye 11. Thus, the connecting rod 10 engages on the crankshaft (not shown in FIG. 1) by means of the big end bearing eye 11 so that a connecting rod bearing shell 35 is between a crankshaft bearing journal of the crankshaft and the big end bearing eye.

It is the object of the invention to provide an improved internal combustion engine and an improved connecting rod.

SUMMARY

According to the invention, lubricating oil bores are introduced into the small end bearing eye and enable a lubricating oil film to be built up between the small end bearing eye and the eccentric. The small end bearing eye has a larger wall thickness in those regions in which the lubricating oil bores are introduced into the bearing eye than in other regions of the bearing eye.

The invention allows lubrication of a contact region between the small end bearing eye and the eccentric accommodated in the aperture in the small end bearing eye. To compensate for weakening of the small end bearing eye caused by the lubricating oil bores, the bearing eye has a larger radial wall thickness in those regions where the lubricating oil bores are introduced into the bearing eye than in adjoining regions. The small radial wall thickness in the regions of the small end bearing eye that are outside those regions in which the lubricating oil bores are introduced enables a reduction in the weight of the connecting rod and provides sufficient clearance between the small end bearing eye and the eccentric rods of the eccentric adjusting device.

The small end bearing eye may have a smaller radial wall thickness in regions opposite the extended eccentric rods of the eccentric adjusting device than in regions in which the lubricating oil bores are introduced into the small end bearing eye. Thus, a clearance is provided between the eccentric rods and the small end bearing eye and weight is reduced.

At least two lubricating oil bores may extend in the radial direction of the small end bearing eye and may be spaced apart circumferentially. The small end bearing eye has a larger wall thickness in those regions in which the lubricating oil bores are introduced into the bearing eye than between these regions in the circumferential direction of the small end bearing eye. Thus, the weight of the connecting rod is reduced further.

Transitions on the small end bearing eye between the regions of different wall thickness are formed continuously and hence in a manner free from discontinuities. Thus, it is possible to provide uniform loading of the material in the small end bearing eye without additional stress increases due to the change in the wall thickness.

Illustrative embodiments of the invention are explained in greater detail by means of the drawings without being restricted thereto.

DETAILED DESCRIPTION

Figure 1:
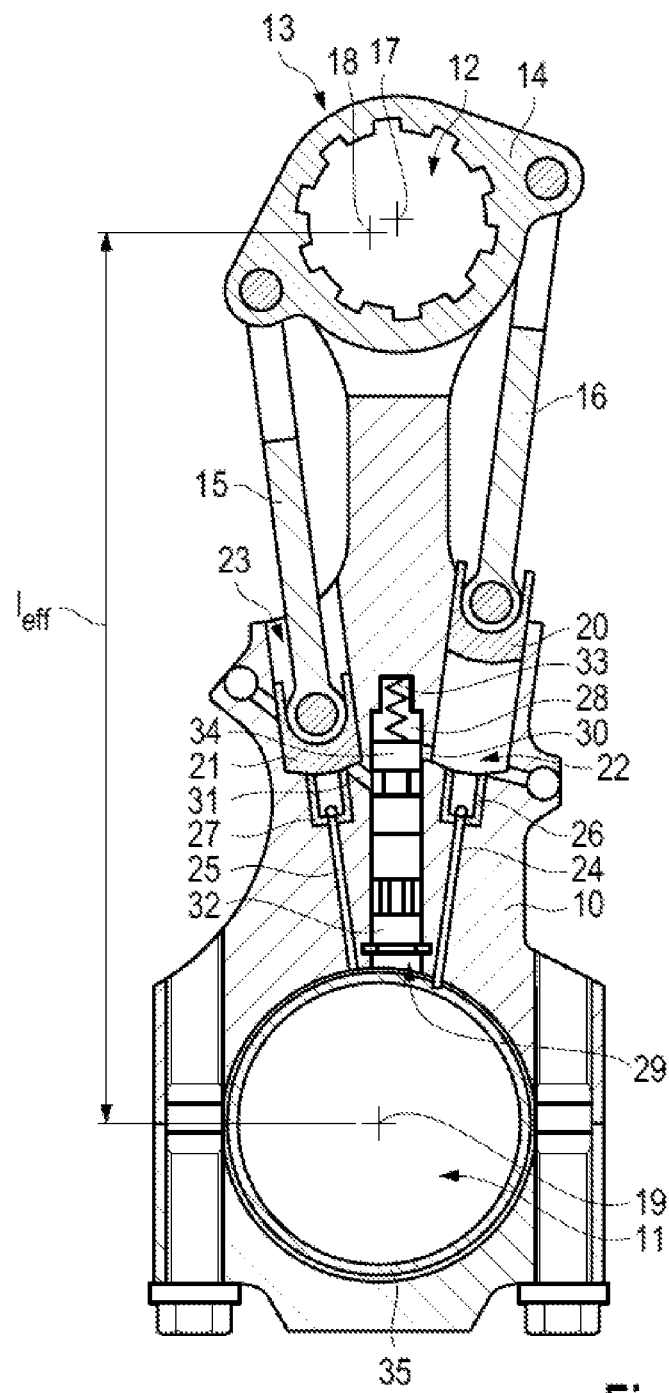
FIG. 1 shows a connecting rod of an internal combustion engine known from the prior art, having an adjustable compression ratio.

An internal combustion engine having an adjustable compression ratio has at least one cylinder, preferably a plurality of cylinders. Each cylinder has a piston that is coupled to a crankshaft of the internal combustion engine by a connecting rod 10. Each connecting rod 10 has a small end bearing eye 12 at one end and a big end bearing eye 11 at an opposite end. The big end bearing eye 11 engages on a crankshaft bearing journal of the crankshaft in such a way that a connecting rod bearing shell is positioned between the crankshaft bearing journal and the big end bearing eye. A lubricating oil film can build up between the connecting rod bearing shell and the crankshaft bearing journal.

An internal combustion engine having an adjustable compression ratio has an eccentric adjusting device 13 in the region of each connecting rod 10 for adjusting the effective connecting rod length of the respective connecting rod 10.

The eccentric adjusting device 13 has an eccentric 36, an eccentric lever 14 and eccentric rods 15, 16 that can be moved in accordance with a hydraulic pressure prevailing in hydraulic chambers interacting with the eccentric rods to adjust the compression ratio. The hydraulic chambers interacting with the eccentric rods 15, 16 can be supplied with hydraulic oil starting from the big end bearing eye 11 of the respective connecting rod. Adjustment of the eccentric adjusting device is initiated by the action of inertia forces and load forces of the internal combustion engine.

The eccentric lever 14 and the small end bearing eye 12 each have an aperture or bore to accommodate the eccentric 36. The eccentric 36 has an aperture or bore which serves to accommodate a piston pin 37.

Lubricating oil bores 38, 39 and 40, 41 are introduced into the small end bearing eye 12 and enable a lubricating oil film to be built up at least between the small end bearing eye 12 and the eccentric 36 and also between the eccentric 36 and the piston pin 37, and into the eccentric 36. The lubricating oil bores 38, 39, 40, 41 allow good lubrication of the contact points between the small end bearing eye 12 and the eccentric 36 and between the eccentric 36 and the piston pin 37 in the end positions of the eccentric adjusting device 13 and during the adjustment of the eccentric adjusting device 13.

Figure 2:
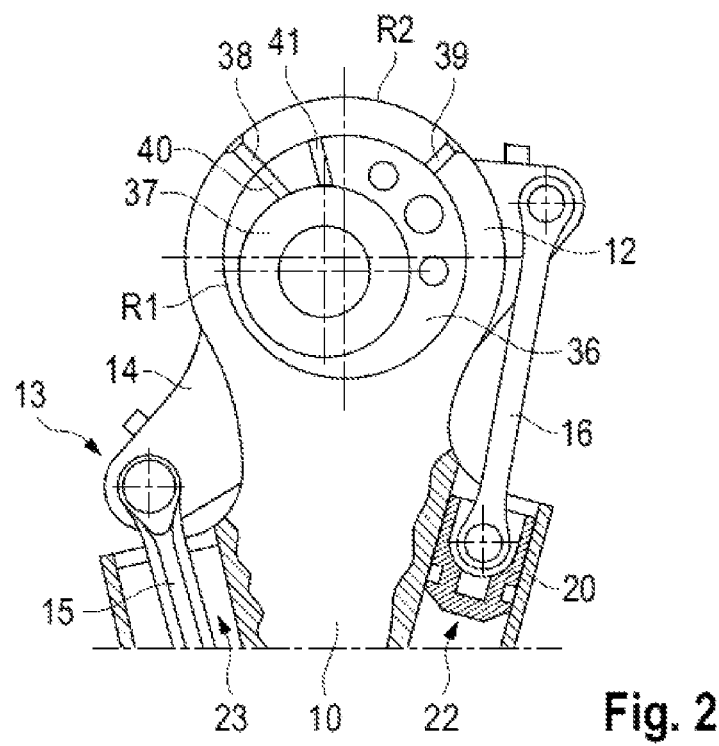
FIG. 2 shows a detail of a connecting rod.
Figure 3:
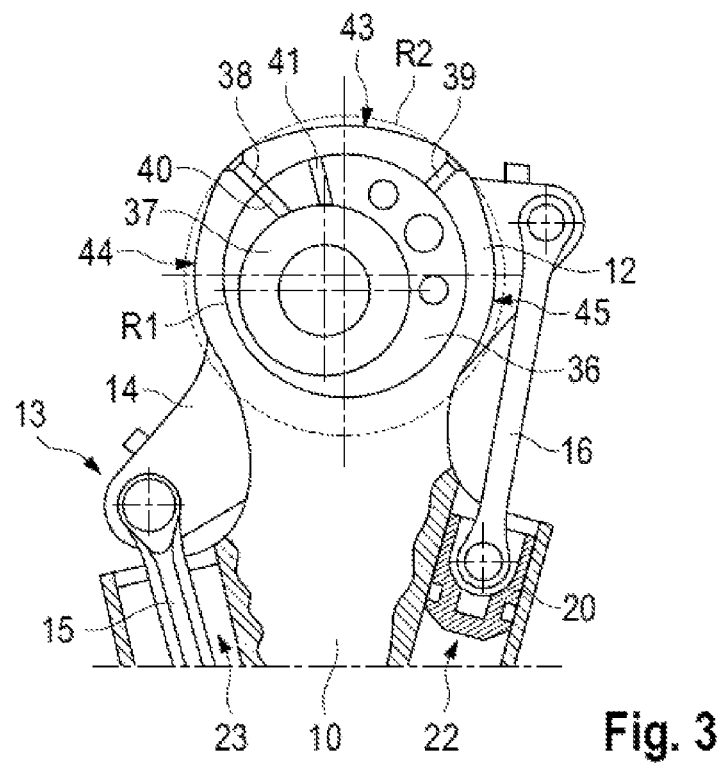
FIG. 3 shows the detail of a connecting rod according to the invention.

According to FIGS. 2 and 3, two lubricating oil bores 38, 39 are introduced into the small end bearing eye 12, and two lubricating oil bores 40, 41 are introduced into the eccentric 36.

The lubricating oil bores 38, 39, 40, 41 are introduced into the small end bearing eye 12 and into the eccentric 36 so that, in a first end position of the eccentric 36 or eccentric adjusting device 13, a first lubricating oil bore 40 in the eccentric 36 aligns with a first lubricating oil bore 38 in the small end bearing eye 12. As a result, a lubricating oil film can be built up between the eccentric 36 and the piston pin 37 via the bores in the first end position (see FIG. 2). The lubricating oil bores 38, 39, 40, 41 further are introduced into the small end bearing eye 12 and into the eccentric 36 so that, in a second end position of the eccentric 36 or eccentric adjusting device 13, a second lubricating oil bore 41 in the eccentric 36 aligns with a second lubricating oil bore 39 in the small end bearing eye 12. Thus, a lubricating oil film can be built up between the eccentric 36 and the piston pin 37 via the bores in the second end position. The second lubricating oil bore 41 in the eccentric 36 does not align with the second lubricating oil bore 39 in the small end bearing eye 12 in the first end position of the eccentric 36 or eccentric adjusting device 13, and therefore a lubricating oil film can be built up between the small end bearing eye 12 and the eccentric 36 via the second lubricating oil bore 39 in the small end bearing eye 12 in the first end position. The first lubricating oil bore 40 in the eccentric 36 does not align with the first lubricating oil bore 38 in the small end bearing eye 12 in the second end position of the eccentric 36 or eccentric adjusting device 13, and therefore a lubricating oil film can be built up between the small end bearing eye 12 and the eccentric 36 via the first lubricating oil bore 38 in the small end bearing eye 12 in the second end position. In the end positions of the eccentric adjusting device 13 and during the adjustment of the eccentric adjusting device 13, the lubricating oil bores 38, 39, 40, 41 allow particularly advantageous lubrication of the contact points between the small end bearing eye 12 and the eccentric 36 and between the eccentric 36 and the piston pin 37.

The lubricating oil bores 38, 39 in the small end bearing eye 12 and the lubricating oil bores 40, 41 in the eccentric 36 each extend in the radial direction of the eccentric 36 and in the radial direction of the small end bearing eye 12. The first lubricating oil bore 40 in the eccentric 36 and the first lubricating oil bore 38 in the small end bearing eye 12 preferably have the same diameter. The second lubricating oil bore 41 in the eccentric 36 and the second lubricating oil bore 39 in the small end bearing eye 12 also preferably have the same diameter.

As already explained, the lubricating oil bores 38 and 39 are introduced into the small end bearing eye 12 and enable a lubricating oil film to be built up between the small end bearing eye 12 and the eccentric 36.

As shown in FIG. 3, the small end bearing eye 12 has a larger radial wall thickness in the regions where the lubricating oil bores 38, 39 are introduced into the small end bearing eye 12, relative to the aperture or bore that accommodates the eccentric 36, in the small end bearing eye 12, than in regions adjoining them.

FIG. 2 shows a radius R1 of the bore in the small end bearing eye 12 that accommodates the eccentric 36, and a radius R2 of the small end bearing eye 12. The difference between these radii R2 and R1 and hence the wall thickness of the small end bearing eye 12, as seen in the radial direction, is almost completely identical over the outer circumference of the small end bearing eye 12 and changes only in the region of the transition to the connecting-rod main body of the connecting rod 10.

According to the invention, as can be seen from FIG. 3, the small end bearing eye 12 has contouring that differs from FIG. 2, and therefore the radial wall thickness of the small end bearing eye 12 in the regions in which the lubricating oil bores 38, 39 are introduced into said bearing eye is larger than in regions adjoining or adjacent to them.

Thus, FIG. 3 shows that two lubricating oil bores 38 and 39 are introduced into the small end bearing eye 12. The bores each extend in the radial direction of the small end bearing eye 12 and are spaced apart in the circumferential direction of the small end bearing eye 12. In the regions of the small end bearing eye 12 in which the lubricating oil bores 38, 39 are introduced into said bearing eye, the small end bearing eye 12 has a larger radial wall thickness than in the region 43 between these regions, as seen in the circumferential direction of the small end bearing eye 12. Thus, as can be seen from FIG. 3, the outer contour of the bearing eye can be set back radially inward relative to radius R2 in this region 43 of the small end bearing eye 12 positioned between the lubricating oil bores 38, 39, as seen in the circumferential direction.

FIG. 3 also shows that the small end bearing eye 12 has a smaller radial wall thickness in regions 44 and 45 directly opposite the respective eccentric rod 15, 16 in the extended state of the respective eccentric rod 15, 16 than in regions where the lubricating oil bores 38, 39 are introduced into the small end bearing eye 12. The outer contour of the regions 44, 45 of the small end bearing eye 12 is set radially inward relative to radius R2.

The smaller wall thickness of the small end bearing eye 12 in regions 44 and 45 provides sufficient clearance for the eccentric rods 15, 16 and also reduces weight. The smaller wall thickness of the small end bearing eye 12 in region 43 also reduces weight.

According to the invention, a wall thickness of the small end bearing eye 12 is optimized for the loading, with a larger radial wall thickness of the small end bearing eye 12 in the region of the lubricating oil bores 38, 39 than in adjoining regions. Sufficient strength or stability of the small end bearing eye 12 and of the connecting rod 10 thus is ensured in the regions of the lubricating oil bores 38, 39, and a low weight also is ensured for the connecting rod 10 while, on the other hand, sufficient clearance is provided for the eccentric rods 15, 16 relative to the small end bearing eye 12.

Transitions on the small end bearing eye 12 between the regions of different radial wall thickness preferably are formed continuously and hence in a manner free from discontinuities. Accordingly, discontinuous transitions between regions of different radial wall thickness on the small end bearing eye 12 are avoided. Uniform loading of the material at the small end bearing eye 12 can thereby be achieved without an additional increase in stress due to the varying wall thickness.

What is claimed is:

1. A connecting rod, having a big end bearing eye for attachment to a crankshaft, a small end bearing eye for attachment to a piston pin of a piston in a cylinder, and an eccentric adjusting device for adjusting an effective connecting rod length, the eccentric adjusting device having eccentric rods that engage on an eccentric lever of the eccentric adjusting device, and the eccentric adjusting device having an eccentric that is guided in an aperture in the eccentric lever and in the small end bearing eye and that has an aperture for accommodating a piston pin, two lubricating oil bores being introduced into the small end bearing eye at positions so that the piston pin is between the lubricating oil bores and the big end bearing eye and via which a lubricating oil film can be built up between the small end bearing eye and the eccentric, the small end bearing eye having opposite inner and outer circumferential surfaces spaced from one another by a radial wall thickness, all areas of the outer circumferential surface of the small end bearing eye being convexly arcuate and configured so that the radial wall thickness in those regions of the small end bearing eye with the lubricating oil bores is sufficiently larger than adjoining regions of said small end bearing eye to compensate for a weakening caused by the respective lubricating oil bore, while a smaller radial wall thickness in areas of the small end bearing eye adjoining the lubricating oil bore achieves sufficient strength and a weight reduction for the connecting rod.

2. The connecting rod of claim 1, wherein at least two of the lubricating oil bores are introduced into the small end bearing eye, the lubricating oil bores extend in the radial direction of the small end bearing eye and are spaced apart in a circumferential direction of the small end bearing eye, the small end bearing eye having a larger radial wall thickness in those regions in which the lubricating oil bores are introduced into the bearing eye than in a region between these regions as seen in the circumferential direction of the small end bearing eye.

3. The connecting rod of claim 2, wherein the small end bearing eye has a smaller radial wall thickness in regions that lie directly opposite or face the extended eccentric rods of the eccentric adjusting device than in regions in which the lubricating oil bores are introduced into the small end bearing eye.

4. The connecting rod of claim 1, wherein transitions on the small end bearing eye between the regions of different wall thickness are formed continuously and in a manner free from discontinuities.

5. The connecting rod of claim 1, wherein the outer circumferential surface of the small end bearing eye at the locations that have the lubricating oil bores are concentric with the inner circumferential surface.

6. The connecting rod of claim 5, wherein the regions of the outer circumferential surface of the small end bearing eye adjoining the regions of the small end bearing eye that have the lubricating oil bores have larger radii of curvature than the regions of the outer circumferential surface of the small end bearing eye that have the lubricating oil bores.

7. The connecting rod of claim 1, wherein the radial wall thickness in regions of the small end bearing eye adjoining the regions that have the lubricating oil bores is more than half of the radial wall thickness of the regions of the small end bearing eye that have the lubricating oil bores.

8. An internal combustion engine that has an adjustable compression ratio, having at least one cylinder and having a crankshaft, on which at least one connecting rod engages, wherein the at least one connecting rod has a big end bearing eye attached to the crankshaft, a small end bearing eye attached to a piston pin of a piston in the at least one cylinder and an eccentric adjusting device for adjusting an effective connecting rod length, the eccentric adjusting device having an eccentric that interacts with an eccentric lever, and eccentric rods that engage on the eccentric lever and are acted upon by a hydraulic pressure prevailing in hydraulic chambers interacting with the eccentric rods, two lubricating oil bores being introduced into the small end bearing eye at positions so that the piston pin is between the lubricating oil bores and the big end bearing eye and via which a lubricating oil film can be built up between the small end bearing eye and the eccentric, the small end bearing eye having opposite inner and outer circumferential surfaces spaced from one another by a radial wall thickness, all areas of the outer circumferential surface of the small end bearing eye being convexly arcuate and configured so that the radial wall thickness in those regions of the small end bearing eye with the lubricating oil bores is sufficiently larger than adjoining regions of said small end bearing eye to compensate for a weakening caused by the respective lubricating oil bore, while a smaller radial wall thickness in areas of the small end bearing eye adjoining the lubricating oil bore achieves sufficient strength and a weight reduction for the connecting rod.

9. The internal combustion engine of claim 8, wherein the outer circumferential surface of the small end bearing eye at the locations that have the lubricating oil bores are concentric with the inner circumferential surface.

10. The internal combustion engine of claim 9, wherein the regions of the outer circumferential surface of the small end bearing eye adjoining the regions of the small end bearing eye that have the lubricating oil bores have larger radii of curvature than the regions of the outer circumferential surface of the small end bearing eye that have the lubricating oil bores.

11. The internal combustion engine of claim 8, wherein the radial wall thickness in regions of the small end bearing eye adjoining the regions that have the lubricating oil bores is more than half of the radial wall thickness of the regions of the small end bearing eye that have the lubricating oil bores.

* * * * *